US008494859B2

(12) United States Patent
Said et al.

(10) Patent No.: US 8,494,859 B2
(45) Date of Patent: Jul. 23, 2013

(54) UNIVERSAL PROCESSING SYSTEM AND METHODS FOR PRODUCTION OF OUTPUTS ACCESSIBLE BY PEOPLE WITH DISABILITIES

(75) Inventors: Joe P. Said, W. Lef., IN (US); David A. Schleppenbach, Lafayette, IN (US)

(73) Assignee: gh, LLC, Lafayette, IN (US)

( * ) Notice: Subject to any disclaimer, the term of this patent is extended or adjusted under 35 U.S.C. 154(b) by 3093 days.

(21) Appl. No.: 10/686,127

(22) Filed: Oct. 15, 2003

(65) Prior Publication Data

US 2004/0143430 A1 Jul. 22, 2004

Related U.S. Application Data

(60) Provisional application No. 60/418,509, filed on Oct. 15, 2002.

(51) Int. Cl.
*G10L 21/06* (2006.01)

(52) U.S. Cl.
USPC ............ 704/271; 704/270; 704/275; 715/239

(58) Field of Classification Search
USPC .......................................................... 704/271
See application file for complete search history.

(56) References Cited

U.S. PATENT DOCUMENTS

| | | | | |
|---|---|---|---|---|
| 5,748,974 | A * | 5/1998 | Johnson | 704/9 |
| 5,953,693 | A * | 9/1999 | Sakiyama et al. | 704/3 |
| 6,072,494 | A * | 6/2000 | Nguyen | 715/863 |
| 6,377,925 | B1 * | 4/2002 | Greene et al. | 704/271 |
| 6,865,599 | B2 * | 3/2005 | Zhang | 709/218 |
| 2003/0130854 | A1 * | 7/2003 | Galanes et al. | 704/277 |

OTHER PUBLICATIONS

Lemlouma et al, "NAC: A Basic Core for the Adaptation and Negotiaion of Multimedia Services", OPERA Project, INRIA, Sep. 2001.*
Blattner et al, "Multimodal Integration" IEEE Multimedia, 1996, vol. 3, Issue 4, pp. 14-24.*
Wang, "Implementation of a Multimodal Dialog System Using Extended Markup Lanugages", Proceedings of the International COnference on Spoken Language Procesing, 2000.*
Trabelsi et al, "A Voice and Ink XML Multimodal Architecture for Mobile e-Commerce Systems", Proceedings of the 2nd International Workshop on Mobile Commerce, 2002.*
http://www.w3.org/TR/2000/WD-nl-spec-20001120 W3C "Natural Language Semantics Markup Language for the Speech Interface Framework" Nov. 200.*

* cited by examiner

*Primary Examiner* — Greg Borsetti
(74) *Attorney, Agent, or Firm* — Keith Swedo

(57) ABSTRACT

DEAF-core technology converts inputs to outputs accessible to people with disabilities. Communication is improved with DEAF-core technology by using data storage and transmission format that includes both semantic information and content. User-defined input, responsible for conveying semantic information, and raw analog input, such as text, are converted into a unique XML format ("gh XML"). "gh XML" includes standard XML encoded with accessibility information that allows a user to communicate both verbal (text) and non-verbal (semantic) information as part of the input. "gh XML" is a temporary format which is further converted using XSLT (extensible Stylesheet Language Transformations) into individual versions of XML specific to each output. After the "gh XML" is converted into the desired XML format, custom rendering engines specific to the desired output convert the individual version of XML into a viable analog format for display.

4 Claims, 1 Drawing Sheet

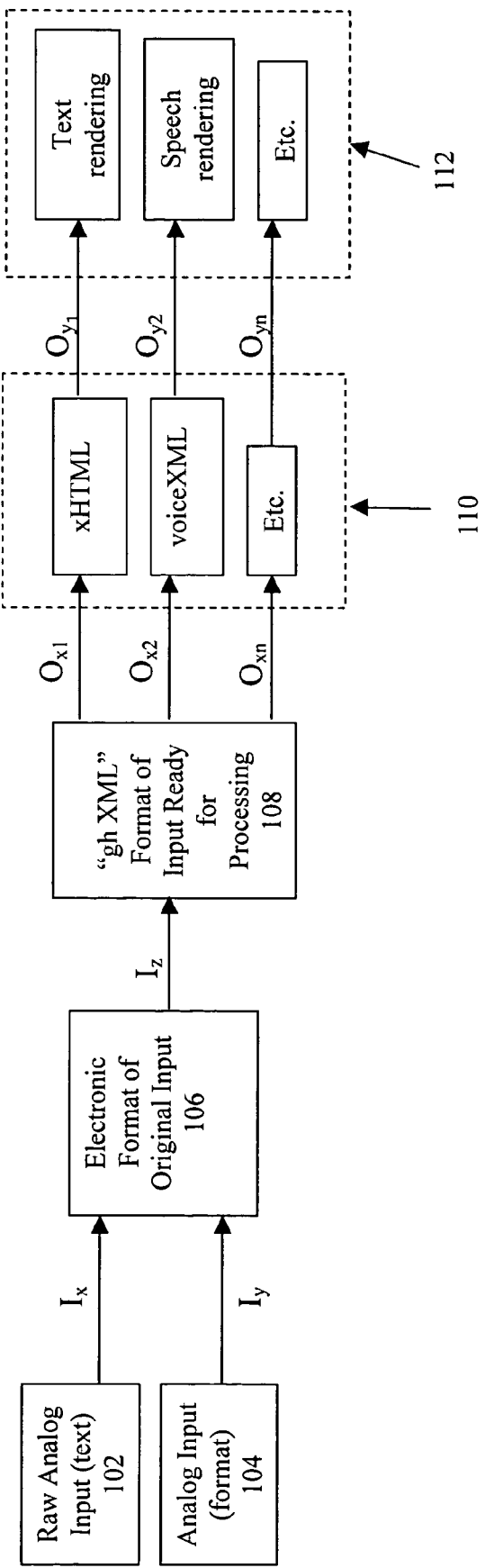

UNIVERSAL PROCESSING SYSTEM AND METHODS FOR PRODUCTION OF OUTPUTS ACCESSIBLE BY PEOPLE WITH DISABILITIES

This application claims the benefit of U.S. Provisional Application 60/418,509 filed Oct. 15, 2002, which is hereby incorporated by reference herein.

FIELD OF THE INVENTION

The present invention relates generally to systems and methods to improve communication for people with disabilities, such as hearing impaired, visually impaired, learning disabled and mobility impaired.

In particular, the invention relates to systems and methods for disabled persons to improve communication. Improved communication includes DEAF-core technology which converts inputs to outputs accessible to people with disabilities. Therefore, people with disabilities will have access to improved communication, with the DEAF-core technology, including Instant Messenger (IM) on a computer or portable device, off line closed captioning for speeches, movies and other audio-based events, real time closed captioning for real-time events such as classroom lectures and meetings, synthesized speech for use with communication devices, for example, TDD/TTYs, and real-time communication for use with portable devices such as cellular phones, personal data assistants (PDA), and portable or personal computers (PC).

BACKGROUND OF THE INVENTION

Modern advances in technology have led to an explosion in the amount of information that is communicated on a daily basis in work, school, and even leisure. The need to communicate effectively and clearly has never been greater than in our modern information age. For a person with any disability that prevents normal means of communication, accessibility of information can prove to be a formidable barrier. Products that can help a wide variety of people with disabilities to better communicate are not only a much-needed tool, but also legislatively mandated through a variety of recent laws, such as the Americans with Disabilities Act, Individuals with Disabilities Education Act and Rehabilitation Act. Section 504 of the Rehabilitation Act states that no individual with a disability can be denied access to any program or activity that receives federal funds due to a disability. Section 508 requires that when Federal agencies develop, procure, maintain, or use electronic and information technology, employees with disabilities have access to and use of information and data that is comparable to the access and use by employees who are not individuals with disabilities. Section 508 also requires that individuals with disabilities, who are members of the public seeking information or services from a Federal agency, have access to and use of information and data that is comparable to that provided to the public who are not individuals with disabilities.

People with a wide range of disabilities, such as deaf and hard of hearing, blind and low vision, learning disabled and mobility impaired are limited in their participation with electronic equipment, for example, computers and cellular phones, and real-time events such as live lectures, movies, meetings and classroom settings.

Closed captioned text for hearing impaired people provide speech translations in real time, but this is not universally available. For example, although closed captioned text is available for some television presentations, not all television networks provide it. Furthermore, closed captioned text is not available for entertainment venues such as motion picture theatres or live plays.

Deaf, hearing impaired and speech impaired individuals primarily communicate with others via sign language or devices such as Telecommunication Device for the Deaf ("TDD"), which is primarily a teletypewriter ("TTY"). Sign language employs hand gestures, body gestures and face expressions to convey language. There are several types of sign language in use today, including Signed English, Pidgin English, and American Sign Language (ASL—the most popular and expressive language). In a case of communication between hearing impaired persons being apart from each other, videophone devices transmit sign language gestures in real-time. But these devices are expensive and not all hearing impaired persons own a videophone device.

The number of people who can be called using a TTY/TDD device is limited because TTY/TDD users can only have conversations with others who have a TTY/TDD device, have access to a TTY/TDD device, and know how to use a TTY/TDD device. Most TTY/TDD devices currently available in the marketplace are land based and the user must have access to a standard telephone line to be able to communicate.

The hearing impaired also use TTY-to-speech relay services to communicate with a hearing person. These services use a person to read TTY text from the hearing impaired person and vocalize the message to the hearing person. In response the person listens to the message from the hearing person and types the TTY text to the hearing impaired person. Relay services are not practical because they require a third party for each and every telephone conversation. This eliminates privacy in personal or financial situations. Moreover, relay readers may make mistakes in vocalizing or typing the conversation.

The Braille format was devised to enable the blind or visually impaired to read alphanumeric characters using their sense of touch. Braille is represented as "cells" of dots raised above the surface of the reading material. Each Braille cell consists of eight dots, arranged in two columns of four dots each. Each character is identified by the specific set of dots that are raised in the cell. Braille writing itself can be formed on different types of media. The most prevalent form of Braille is printed material. Braille is printed using special printers that emboss the raised dots on sheets of paper or plastic. Furthermore, the additional processing required to produce a Braille publication or reproduce a regular publication in Braille format, as well as the extra size of the materials, increase the expense of producing these publications. This severely limits the scope of material available in Braille.

Clearly, it would be desirable to develop improved methods and systems that allow the communication capabilities of people with disabilities to be extended in the digital technology world. Over the past several years, it has become imperative for companies to develop systems, processes, and apparatus that enable people with disabilities to communicate more efficiently and effectively. The DEAF-core technology is software, based on existing technologies and a specialized version of XML termed "gh XML", that converts a variety of inputs into a variety of desired outputs for improved communication for people with disabilities.

SUMMARY OF THE INVENTION

Modern society revolves around computers, and the use of computers has spawned several new means of communication that are used in all facets of life, including school and work. Specifically, the World Wide Web, e-mail and instant messenger (IM) software are becoming the standards for communication for education, business and personal settings. In particular, instant messenger software, where two people interact in real time over the Internet in much the same way as a telephone is used, is quickly becoming an accepted means of conducting business. Interestingly, because the IM software functions much like an old-fashioned telegraph in its communication method, it provides some unique opportunities for accessibility for persons with disabilities.

DEAF-core technology converts inputted data in order to transmit and display the information on a monitor or display screen so that people with disabilities can more efficiently and effectively communicate. Data is inputted, using modes such as text entry via typing on a keyboard, human speech or sign language.

All input techniques consist of two main parts: the ability for the user to enter the raw text information, for example by speaking, gesturing (sign language), writing, or typing, and also the ability for the user to indicate formatting and structure for the text as well. For example, the user could use special keystrokes, pull-down menus, voice commands, or even special gestures or handwritten symbols to indicate such things as emotional content, visual formatting, headings and other document structure, and so forth. Further input from the user as to format and nonverbal meaning may not be necessary in the case of the transmission of text-only messages.

Text entry is used by people who prefer to input data using a keyboard, writing stylus with handwriting recognition, or similar process to communicate. The information is entered character-by-character and stored as a string of electronic text in preparation for processing. Speech is used by people who prefer to input data using their voice (such as mobility impaired users or AAC—Augmentative and Alternative Communication users) to communicate. The information is entered phoneme-by-phoneme and converted word-by-word into a string of electronic text by voice recognition. The data is then ready for processing.

Sign language is used by people who prefer to input data using hand gestures and facial expressions. Different types of sign language can be supported; however, the main purpose of the DEAF-core technology is to support American Sign Language (ASL).

One method of inputting American Sign Language (ASL) is by using Galvanic Skin Response (GSR). GSR is a form of biofeedback that can be used to control and interface with computers. The process of the brain sending signals to the rest of the body to perform actions involves the transmission, along the central and peripheral nervous system, of minute electrical signals. These signals are received, retransmitted, and sometimes amplified by individual neurons and ganglia along the neural pathway. GSR measures these signals by analyzing the tiny voltage differences on the skin of the user that occur in parallel with these nervous system signals.

The basic principle of the GSR approach is the same as that of ASR—one breaks down the analog input (in this case a voltage fluctuation rather than a sound wave) into small pieces, in this case morphemes (basic units of meaning) and then compares those pieces to a sample database of known morphemes built up by the user. A string of morphemes is then put together, which can be translated into something meaningful (like text) with a separate process.

This is a technique that reads the tiny voltage differences on the skin of the user that are created by the process of the brain sending nervous system signals to various parts of the body. Since the user must send these signals to the hands, arms, and face when making ASL signs, the computer can read the unique voltage fluctuations for each particular sign and convert them into text equivalents. The information streams into the computer morpheme-by-morpheme, meaning that the smallest basic units of meaning are captured and later decoded by the computer in preparation for the processing stage. The morphemes themselves are basic units of animation or motion that correspond to meaning in ASL or whatever signing language is being employed. In the output stage, these morphemes are referred to as visiemes, which are basic units of animation that are strung together to create ASL output via a computer-generated signing avatar, or computer generated person. The morphological information is converted using SLR (sign-language recognition) algorithms into a string of electronic text. The data is then ready for processing.

Sign Language Recognition (SLR) is, as the name suggests, about recognition of gestures and/or sign language using computers. SLR allows a human signer to automatically convert the gestures, motions, and expressions of sign language into an electronic text format. A number of hardware techniques are used for gathering information about body positioning; typically either image-based (using cameras, moving lights etc) or device-based (using instrumented gloves, styli, position trackers etc.), although hybrids are in the process of development.

Information can also be inputted by Automatic Speech Recognition (ASR). ASR is captured by a sound-responsive element in a microphone that converts variable sound pressure into equivalent variations of an electrical signal, i.e. current or voltage. This analog signal is then sampled and quantized into a digital bit stream (format). Conventional ASR works by breaking down the sound as it enters the computer into individual snippets of sound, which are either phonemes or combinations of phonemes, and then comparing those snippets to samples held in a database. The sample database is typically created by the user during a training period so that the process can be accurate and specific for each person's voice. Once the phonemes are identified as a match, a text equivalent is generated for each snippet and a full string of text is concatenated for the overall sound input. This string of text-phonemes is translated into meaningful text with a large dictionary of words and phoneme equivalents, along with some translation rules.

Further advancements to ASR may include the use of special digital and mechanical filters to convert all speakers' voices into one uniform voice prior to the actual recognition engine being employed. This allows the engine to work for all people without any training period being needed at all. Another example may include the addition of custom algorithms to detect emotional and other non-verbal cues in the speaker's voice, and automatically assign the semantic markup instead of having that occur in a separate stage. For purposes of this application, semantic means information that is predominantly non-verbal or non-contextual in nature, but nonetheless conveys important meaning in the communication. For example, when a speaker emphasizes a word they will increase the volume of the word, pause before or after the word, and so forth. The custom algorithms detect these pauses and other changes in prosody and automatically encode that information in the output.

Several sub-processes capture both the content and the semantics of the user input and convert into electronic format which are further converted into "gh XML" language, a unique version of XML that includes standard XML encoded with accessibility information. "gh XML" is a text file with markup tags and is a powerful means of communication since it allows for almost any type of visual formatting of information, which is useful in conveying the nonverbal aspects of communication, such as tone of voice and emotional content.

XML is the emerging standard language of communication for the Internet and is being adopted for almost all forms of electronic communication, including WWW pages, e-mail, and Instant Messaging (IM) software. XML is a very flexible choice for a language of communication because every language including Sign Language, Braille, and mathematics can be conveyed using it.

XML files are quite small and will transmit via telephone or Internet very quickly. XML documents are also easily converted into many other file formats including text-only documents for those applications that do not require any visual formatting. Many commercially available compression algorithms already exist that can compress, transmit, and uncompress XML documents in real time.

The unique version of "gh XML" is converted into individual versions of XML that is specific to each output. For example, "gh XML" is converted to XHTML for a text display output, VoiceXML for a Synthesized Speech output and custom XML for outputs of vSL, eBRL and eLP discussed below. A rendering engine for each specific output is responsible for actually creating the output display from the individual versions of XML.

Output modes include text display, Electronic Large Print (eLP), electronic Braille (eBRL), virtual Sign Language (vSL), and synthesized speech (using text-to-speech or TTS technology).

Text Display is used by people who prefer to visually read the output of the device, and who have the ability to read normal-sized print. The results of the processing stage are converted into the text display by a rendering engine capable of visually rendering XML data. One example of such an engine is Internet Explorer or Accessible Instant Messenger. The various hardware devices associated with DEAF-core utilize either the Accessible Instant Messenger as the text rendering engine or a version of Internet Explorer. Accessible Instant Messenger (AIM) is an Instant Messaging (IM) utility based on the DEAF-core technology that uses a proprietary protocol not understood by other instant-messaging services.

The text display contains some basic formatting as well, which is the power of using XML as the method of data storage. For example, words that the input speaker emphasizes with their voice can be displayed as bold during the text rendering of the output. Finally, the text display supports basic graphics as well such as emoticons ☺ (smiley-face, indicating happiness or laughter) which are commonly used in instant messaging situations. This makes all devices associated with DEAF-core very powerful in terms of communication bandwidth between disabled and non-disabled people. These are all made possible by the use of XML (and in particular, by a flavor of XML called SVG or scalable vector graphics) which encode both text an images with the aid of loss-less algorithms. This means that rather than rely on optical enhancement techniques, which result in fuzziness, blurriness, or other aberrations in the image, digital enhancement techniques are used that do not negatively alter the original features of the image or text. The text display further includes contrast enhancement, zooming features, text highlighting and Braille.

Electronic Large Print (eLP) is used by people who prefer to read the text output but who cannot read ordinary print displays (i.e. low-vision users). eLP permits people with low vision to read documents on any computer wherever they may go even if the computer is not equipped with screen enlargement software. eLP includes functionality to enlarge documents by zooming in and out. Further, a major advantage of the eLP output over traditional Large Print books is the ability of the user to navigate and search the document because it is electronic. Users may benefit from a page preview display box to gain perspective on the current display location relative to the entire page. With eLP, users can go directly to a specific page, navigate by page, and print on demand. Some special features of the large print rendering engine include the ability to replace colors in the color palette with other colors (for color-blind users), the ability to enhance contrasts with gamma correction or photo-negative images, and the ability to zoom and magnify both images and text to an arbitrary level without loss of quality.

Electronic Braille (eBRL) is the electronic version of hard copy Braille with the output as a series of raised dots (i.e. blind users who are Braille readers). This type of output is used in conjunction with either a Refreshable Braille Display, which simulates Braille by vibrating a series of small pins in real-time, or with a Braille Embosser, which prints out a hard-copy of Braille by embossing raised dots on a piece of paper. The computer sends a string of data to the refreshable Braille display, similar in fashion to how data is spooled to a printer. The display has a microprocessor that converts that text into a series of electrical signals that cause pins to move up and down in precise patterns to simulate Braille. There are controls on the device, similar in function to a mouse and keyboard, for the user to move through the text. The Refreshable Braille Display is felt rather than looked at. Further, eBRL output provides the ability of the user to navigate and search the document because it is electronic.

Special emphasis can be conveyed in the Braille output based on the semantic information encoded in the XML. For example, a particular word on a Braille display can be made to "blink" by vibrating the words rapidly, communicating emphasis to the reader. Other examples include special formatting characters in the Braille string for bold, italics, or to indicate header information.

Virtual Sign Language (vSL) is useful for people to see gestures and other non-text visual output of the device, such as Deaf and Hard-of-Hearing users. The input of text or audio is translated into American Sign Language (ASL), although other types of sign language can be displayed as well. Basic units of animation (called visiemes) are strung together into a complete video clip of a signing avatar, or computer generated person. The visiemes can either be composed of video clips of a human signer or consist of video clips of an entirely computer-generated human model. Non-verbal information such as facial expressions can be conveyed by displaying different types of visual signs for the information. For example, a word of ASL output can be accompanied by frowning or smiling on the face of the signing avatar. Text captioning is typically provided in synchronization with the vSL.

Synthesized Speech is used by people who prefer to listen to the output of the device, such as blind users. A rendering engine capable of aurally rendering XML data (in this case, a specific flavor of XML called Voice XML), for example, any standard SAPI-compliant (Speech Application Programming Interface) TTS (text-to-speech) engine such as the standard Microsoft voices, Scansoft, AT&T, and other commercial voices. The rendering engine works by converting the text output into a string of phonemes and special instructions for emphasis of phonemes (such as changing the volume, speed, or pitch) and concatenating those sound bits into an audio file (such as MP3 or WAV) for playback. The quality of the speech output is crucial and hence the DEAF-core process typically uses concatenated speech and other high-quality techniques as opposed to true synthesized speech, although any technology can be used. The synthesized speech may also convey some non-verbal communication elements as well, so that in the above example of the speaker emphasizing a word with his voice, the synthesized speech output would also emphasize that particular word as well (by increases in volume or a different pitch). In addition, certain structural elements of the text such as headings can be conveyed by the use of different voices.

Synchronized Multimedia output is the process by which many different output modes are displayed in concert to the user, synchronized down to the finest granularity level possible in the language being used (for example, by letter when in English, by morpheme when in ASL, by character when in Braille) or at higher levels (by-word, by-sentence, by-paragraph). In the case of the DEAF-core products it means that all of the outputs discussed above can be displayed at once to the user, or the user can pick and choose which outputs he prefers to access. So, for example, a blind student could access both e-Braille and Synthesized Speech output simultaneously, or a deaf user could access both e-Large Print and Virtual Sign Language simultaneously.

The inputs and outputs are transmitted via using a telephone, modem, standard Instant Messaging (IM), Speech Access TeleType (SATT), or an asynchronous process such as e-mail or File Transfer Protocol (FTP) that transports information between geographically separated computers.

The inputs and outputs are transmitted via the Internet using standard compression and uncompression routines. Examples of standard compression routines include ZIP, RAR, PKZIP, WinZip and ARJ. Most IM protocols already include some form of compression technology built in, so that the actual amount of data transferred across the WWW is as small as possible. Standard uncompression routines include, for example, PZUNZIP.

A modem is typically used to send digital data over a phone line. The sending modem modulates the data into a signal that is compatible with the phone line, and the receiving modem demodulates the signal back into digital data. Wireless modems convert digital data into radio signals and back.

SATT converts input into synthesized speech for a hearing user. The hearing user's spoken response is converted into text by ASR and displayed to the deaf user on a small text display.

Instant Messaging is currently employed by four major vendors: America On-Line, Microsoft, Yahoo and ICQ. Instant Messaging (IM) utilities, such as Accessible Instant Messenger (AIM) uses a proprietary protocol that is not understood by other instant-messaging services. Therefore, the format of the data depends on the IM utility used. Messages and connection information are maintained on servers controlled by the provider of the IM utility. The Accessible Instant Messenger (AIM) is a spin-off product based on the DEAF-core technology. AIM works entirely at the client-side, meaning that any of the four major IM protocols mentioned above can be supported, in addition to other proprietary protocols. Changes in the IM protocol do not affect the AIM client as it serves only as a front end for the core IM transfer technology employed by the major IM vendors.

A primary advantage of the DEAF-core technology lies in the ability to utilize this proprietary software platform to immediately spin off numerous commercialized hardware devices. A partial list (and description) of several of these hardware devices follows.

One such device is a hardware device that includes Accessible Instant Messenger software. Instant Messenger data is input by typing on a keyboard, speaking into a microphone, or using sign language. The text inputted on a keyboard is transmitted by modem of the Internet to be displayed on the receiving display screen as text and virtual sign language in concert with synthesized speech. The speech inputted into a microphone uses speaker-independent speech recognition (ISR) to convert the speech to text and virtual sign language to be outputted on the receiving display screen. Sign language recognition (SLR) is used to receive and convert the sign language signals to text and virtual sign language in concert with synthesized speech on the receiving display screen. The receiving display screen includes contrast enhancement, zooming features, text highlighting and Braille that can be sent to a Refreshable Braille Display.

Another device implements offline closed captioning for speeches, movies and other audio-based events that are typically inaccessible to people who are hearing impaired. A portable device is used in theaters, for example, to view the captioning in synchronization with the movie. The portable device is a PDA, portable personal computer or a transparent virtual reality wearable eyepiece to convey text or virtual sign language. A hardware device is installed on-site in the theatre to convert the audio of the movie using DEAF-core technology explained in the Detailed Description. The audio may be transmitted to the hardware device, for example, via the Internet or a microphone. The converted audio is transmitted to the receiver of the portable device via a wireless connection such as Infrared or Bluetooth technology. The portable device displays text or virtual sign language so the end user receives offline closed captioning. A particular feature of this technology is that any data can be displayed in parallel with the event, such as actor filmographies, producer notes, or alternate language tracks (both audio and subtitles). This extends the utility of the off-line captioning device to many fields other than just textual data for the hearing impaired.

Infrared uses light waves to transmit and receive information between devices whereas Bluetooth uses 2.45 gigahertz radio frequency standard. Bluetooth wirelessly and automatically allows electronic equipment such as computers, cell phones, keyboards and headphones to make connections, without wires, cables or any direct action from a user. The hardware spin-offs from DEAF core, such as the off-line closed captioning device mentioned above, can utilize infrared, Bluetooth, other 802.11 specifications for wireless transfer, or any other standard wireless data exchange technique to communicate the XML information to the hardware unit.

An alternate device implements real time closed captioning for real-time events, such as classroom lectures, presentations and meetings. People who are hearing impaired use a portable device to view caption the event in real time. The portable device is a PDA or portable personal computer that communicates text or virtual sign language on the display screen. A hardware device is installed on-site to convert the audio of the lecture, presentation or meeting. The audio of lecture presentation or meeting is transmitted to the hardware device, for example, via speaker or microphone. The audio is converted using the DEAF-core technology and transmitted to the receiver of the portable device via a wireless connection such as Bluetooth technology as described above. The portable device displays text or virtual sign language so the end user receives offline closed captioning.

A speech accessible teletype encompasses DEAF-core technology to eliminate the need for both parties to possess a TDD/TTY device. Data is input by the hearing impaired user by typing on a keyboard, speaking into a microphone or using sign language. Data is input by the hearing user via telephone. The hearing user speaks into the telephone. The audio is send to the TDD/TTY device that converts the audio into either text or sign language. Sign language is converted using the virtual Sign Language (vSL) aspect of DEAF-core technology so that the text and/or virtual sign language are displayed on the TDD/TTY display screen. The hearing impaired user responds by either typing text into the TDD/TTY device or using sign language. The text is converted using the Speech Access TeleType (SATT) and sign language is converted using virtual Sign Language (vSL) to provide synthesized speech to the hearing user. The synthesized speech can heard over a standard telephone.

A cell phone, termed an Accessible Cell Phone (ACP), or PDA utilizing the DEAF-core technology enables a disabled user to communicate in real-time just like the non-disabled user on the other end of the line. The phone would convert spoken language from the non-disabled user into a text output in real time for the disabled user. This text would be displayed on the display screen simultaneously with the actual speech. This text display would have a variety of display options to account for low-vision users needing contrast enhancement or enlargement. Deaf or hard-of-hearing users could read the text display, and users with auditory learning disabilities could follow the text highlighting in real time along with the audio stream.

A server-based distributed application model is used to deliver the information content without burdening the client (in this case the cell phone) with a large memory footprint or intense processor requirements. Hence the processing of DEAF-core is done on a centralized server, and the information is delivered using wireless web connectivity technology. Many different options for content delivery to cell phones via the WWW currently exist. The client cell phone stores only the information needed to display text and the information needed to display the vSL avatar, which has a larger footprint but is still possible. In order to render the avatar, the information about position and movement of each graphical element (such as an arm, a finger, torso) is stored locally. Each element is stored as a pre-rendered graphical image, and then the action of signing is generated by sending a stream of data that contains position and movement commands for each element of the avatar. The data being sent is similar in size to an XML page, in that it is simply a small text file containing the elements of position and motion. Such files can be uploaded and downloaded very quickly even over a slow Internet connection.

Likewise, the conversion of speech to an electronic format for later retransmission as text or Virtual Sign Language (vSL) is not performed locally, but rather using the distributed application model. The client phone will simply capture and send the audio stream (a function that all cell phones currently perform by definition) to a centralized server, which bears the processor burden of converting the information into electronic format. The resultant text or vSL file will then be sent to the user on the other end of the line.

DEAF-core is the core technology to allow disabled users a variety of inputs and outputs, so that people who cannot speak for themselves, cannot read print, cannot type, etc. have the ability to still communicate. The core functionality of the software in combination with the core functionality of the hardware allows for a large variety of interesting applications, for example, an inexpensive and portable replacement Telecommunications Device for the Deaf/Teletype (TDD/TTY). Other applications of the core technology for the hearing-impaired in particular include a cell phone that is accessible for the hearing impaired, a portable real-time sign language system for theaters, a real-time Closed Captioning system for events and classrooms, and more.

Although it is the primary plan to focus on hearing disabilities, it is noted that other types of disabilities, including sensory disabilities such as visual impairments, severe disabilities such as mobility impairments, and even learning disabilities will be served as well. For example, visually impaired people could benefit from accessible IM, e-mail, and WWW browser programs based on the core technology, allows speech and/or Braille access to these means of computer-based communication. Hardware applications include Braille TDD replacements for the Deaf-Blind, and Large Print and speech-enabled PDA's. Mobility impaired users benefit from the alternative input modes including speech, allowing portable access and communication using e-mail and IM software. Learning disabled users also benefit from a multimodal PDA that conveys information using both text and speech.

The present invention includes core software technology, DEAF-core. Further, the present invention includes the emerging technology of virtual Sign Language (vSL) to convey information using a computer-generated avatar that communicates via sign language and Sign Language Recognition (SLR), a technology that allow a computer to recognize a human signer and convert that information into text. Finally, the present invention includes the development of key software and hardware innovations designed to assist disabled people in communication in a digital world.

DEAF-core technology allows the input of semantic content alongside the actual data and greatly enhances the communication between users of the device by allowing for both ordinary verbal and non-verbal communication to occur. An analogy to help explain why this is special is the difference between talking to someone over the phone, and having the same conversation in person, where body language, facial expressions, and other non-verbal parts of communication become very important.

BRIEF DESCRIPTION OF THE DRAWINGS

FIG. 1 is a flow chart of the DEAF-core technology of the system and method of the present invention.

DETAILED DESCRIPTION

FIG. 1 is a flow chart of the DEAF-core technology, of the system and method of the present invention. Inputs are converted into a unique XML format ("gh XML"), developed by gh, LLC located in West Lafayette, Ind. "gh XML" is necessary for the processing step, in which the inputs are rendered into outputs for display.

All input techniques consist of two main parts: first, the ability for the user to enter the raw text information (step 102), for example by speaking, gesturing (sign language), writing, or typing; second, the ability for the user to indicate formatting and structure for the text as well (step 104). For example, the user could use special keystrokes, pull-down menus, voice commands, or even special gestures or handwritten symbols to indicate such things as emotional content, visual formatting, headings and other document structure. Addition input from the user as to format and nonverbal meaning may not be necessary in the case of the transmission of text-only messages.

In reference to FIG. 1, the input process (I) is composed of the three individual sub-processes such that $I=(I_x+I_y)+I_z$. Step 106 is the conversion of the sum of the two first-stage inputs $(I_x+I_y)$ into an electronic format.

Sub-process $I_x$ involves the use of standard techniques to convert analog signal into a counterpart that is a digital electronic string of text. For example, speech recognition is used to convert analog sound inputs into a text string. Keyboard circuits and buffers are used to convert key presses into a text string, handwriting recognition is used to convert stylus markings into a text string, and the special SLR (sign-language recognition) engine is used to convert gestures and facial expressions into a text string. This SLR engine may use galvanic skin response technology discussed above.

Sub-process $I_y$ involves the use of user-defined input, responsible for conveying semantic information, to further encode the analog inputs. In parallel with the analog inputs, the user activates a user interface to embed special "control codes" in the input as it enters the processing step. For example, a deaf user could use special hand gestures to indicate bold, a blind user could speak the word "smiley-face" to embed a smiley-face ☺ emoticon and the keystroke CTRL+B could be used by a typist to indicate bold text. These "control codes" are passed to the next sub-process $I_z$ embedded in the exact point in the analog input stream, as defined by the user.

The sum of the two first-stage inputs ($I_x+I_y$) is then converted into "gh XML" by sub-process $I_z$ (step 108). The XML language used for the DEAF-core technology is a unique format of XML, termed "gh XML" that includes standard XML encoded with accessibility information. This unique version of XML consists of special element tags and attributes for these elements that allow a user to communicate both verbal (text) and non-verbal (semantic) information as part of the input. The standard XML encoded with accessibility information, or "gh XML" is created by the simultaneous inputs of $I_x$ and $I_y$. The purpose of sub-process $I_z$ is to create a valid, well-formed XML document that creates the information needed for the various displays for output. The "gh XML" output of $I_z$ uses for example, XML v1.0, ANSI/NISO Z39.86 DTB specification (including the DTBook DTD), gh Namespace or SMIL 1.0.

The remaining process includes rendering the "gh XML" into outputs for display. "gh XML" is a temporary format which is further converted into individual versions of XML specific to each output. In step 110, sub-process $O_{xn}$ is used to transform the unique version of "gh XML" into each individual versions of XML that is specific to each output.

The output desired determines the individual version of XML that "gh XML" is converted into. For example, "gh XML" is converted to XHTML for a text display output (output of $O_{x1}$), VoiceXML for a Synthesized Speech output (output of $O_{x2}$) and custom XML for outputs of vSL (output of $O_{x3}$), eBRL (output of $O_{x4}$) and eLP (output of $O_{x5}$). Sub-processes $O_{xn}$ are performed using XSLT (eXtensible Stylesheet Language Transformations), which is a process to convert one form of XML to another.

Each output is created using a particular rendering engine. Once the "gh XML" is converted into the desired XML format, dependant on the output desired, sub-processes $O_{yn}$ utilizes specific rendering engines to convert the individual version of XML into a format for display. Each rendering engine converts each individual version of XML into a viable analog output. For example, XHTML uses rendering engines such as MS Internet Explorer v6.0 or greater; VoiceXML uses rendering engines such as custom TTS rendering engine, AT&T Desktop, Scansoft or RealSpeak; and each custom XML for vSL and eBRL and eLP all use a custom rendering engine. Each rendering engine (sub-processes $O_{yn}$) converts the each individual versions of XML from a digital document back into an analog output (display, speech) for display to the user.

Each of the outputs is displayed on a monitor or other display device utilizing user interfaces such as the Accessible Instant Messenger. In addition, outputs can be displayed on custom user interfaces such as gh PLAYER, gh TOOLBAR and Accessible Testing Station. The gh PLAYER, gh TOOLBAR, and Accessible Testing Station.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

We claim:

1. A method of input conversion to output, said conversion method comprising:
    entering a first stage input and a second input; translating the first input and the second input into an electronic format;
    converting the electronic format into standard XML encoded with accessibility information;
    transforming the standard XML encoded with accessibility information into individual version of XML dependent on desired output; and
    utilizing a rendering engine to modify the individual version of XML into a format for the output,
    wherein said entering step includes speaking, and
    wherein said translating step includes the use of automatic speech recognition of the first input and the second input to produce the electronic format, the first input including verbal information, and the second input including non-verbal information.

2. A method of input conversion to output, said conversion method comprising:
    entering a first stage input and a second input; translating the first input and the second input into an electronic format;
    converting the electronic format into standard XML encoded with accessibility information;
    transforming the standard XML encoded with accessibility information into individual version of XML dependent on desired output; and
    utilizing a rendering engine to modify the individual version of XML into a format for the output,
    wherein said entering step includes gesturing, and
    wherein said translating step includes the use of sign language recognition of the first input and the second input to produce the electronic format, the first input including verbal information, and the second input including non-verbal information.

3. A method of input conversion to output, said conversion method comprising:
    entering a first input including text information and a second input including semantic information;
    translating the first input and the second input into an electronic format;
    converting the electronic format into standard XML encoded with accessibility information;
    transforming the standard XML encoded with accessibility information into individual version of XML dependent on desired output; and
    utilizing a rendering engine to modify the individual version of XML into a format for the output,
    wherein the same medium comprises automatic speech recognition.

4. A method of input conversion to output, said conversion method comprising:
    entering a first input including text information and a second input including semantic information;

translating the first input and the second input into an electronic format;
converting the electronic format into standard XML encoded with accessibility information;
transforming the standard XML encoded with accessibility information into individual version of XML dependent on desired output; and
utilizing a rendering engine to modify the individual version of XML into a format for the output,
wherein the same medium comprises sign language recognition.

* * * * *